US007680657B2

(12) United States Patent
Shi et al.

(10) Patent No.: US 7,680,657 B2
(45) Date of Patent: Mar. 16, 2010

(54) AUTO SEGMENTATION BASED PARTITIONING AND CLUSTERING APPROACH TO ROBUST ENDPOINTING

(75) Inventors: Yu Shi, Beijing (CN); Frank Kao-ping Soong, Beijing (CN); Jian-lai Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 822 days.

(21) Appl. No.: 11/504,280

(22) Filed: Aug. 15, 2006

(65) Prior Publication Data

US 2008/0059169 A1 Mar. 6, 2008

(51) Int. Cl.
*G10L 15/04* (2006.01)
*G10L 15/20* (2006.01)
*G10L 15/00* (2006.01)

(52) U.S. Cl. ....................... 704/233; 704/218; 704/237; 704/254

(58) Field of Classification Search ....................... None
See application file for complete search history.

(56) References Cited

U.S. PATENT DOCUMENTS

| | | | | |
|---|---|---|---|---|
| 5,295,190 | A | 3/1994 | Yamashita et al. | 704/248 |
| 5,649,055 | A | 7/1997 | Gupta et al. | 704/233 |
| 5,692,104 | A | 11/1997 | Chow et al. | 704/253 |
| 5,812,972 | A * | 9/1998 | Juang et al. | 704/234 |
| 5,963,901 | A | 10/1999 | Vahatalo et al. | 704/233 |
| 6,208,967 | B1 * | 3/2001 | Pauws et al. | 704/256.8 |
| 6,216,103 | B1 | 4/2001 | Wu et al. | 704/253 |
| 6,321,197 | B1 | 11/2001 | Kushner et al. | 704/270 |
| 6,324,509 | B1 | 11/2001 | Bi et al. | 704/248 |
| 6,405,168 | B1 | 6/2002 | Bayya et al. | 704/256 |
| 7,260,439 | B2 * | 8/2007 | Foote et al. | 700/94 |
| 7,346,516 | B2 * | 3/2008 | Sall et al. | 704/500 |
| 2001/0014854 | A1 | 8/2001 | Stegmann et al. | 704/211 |
| 2005/0216261 | A1 | 9/2005 | Garner et al. | 704/215 |

FOREIGN PATENT DOCUMENTS

WO WO0186633 11/2001

OTHER PUBLICATIONS

Goodwin, M. et al. "Audio segmentation by feature-space clustering using linear discriminant analysis and dynamic programming," 2003 IEEE Workshop on Signal Processing, Audio and Acoustics, Oct. 19-22, 2003.*

Bing-Fei Wu., "Robust Endpoint Detection Algorithm Based on the Adaptive Band-Partitioning Spectral Entropy in Adverse Environments". IEEE Transactions on Speech and Audio Processing, vol. 13, No. 5, Sep. 2005, pp. 762-775.

Hugo Meinedo et al., "Audio Segmentation, Classification and Clustering in a Broadcast News Task" L2F—Spoken Language System Laboratory, 4 pages, Proc. ICASSP, 2003.

Nikos Doukas et al. "Voice Activity Detection Using Source Separation Techniques", Signal Processing Section, Dept. of Electrical Engineering, Imperial College, UK, 4 pages, Eurospeech—1997, (1997).

* cited by examiner

*Primary Examiner*—Matthew J Sked
(74) *Attorney, Agent, or Firm*—Theodore M. Magee; Westman, Champlin & Kelly, P.A.

(57) ABSTRACT

Possible segmentations for an audio signal are scored based on distortions for feature vectors of the audio signal and the total number of segments in the segmentation. The scores are used to select a segmentation and the selected segmentation is used to identify a starting point and an ending point for a speech signal in the audio signal.

17 Claims, 4 Drawing Sheets

AUTO SEGMENTATION BASED PARTITIONING AND CLUSTERING APPROACH TO ROBUST ENDPOINTING

BACKGROUND

Speech recognition is hampered by background noise present in the input signal. To reduce the effects of background noise, efforts have been made to determine when an input signal contains noisy speech and when it contains just noise. For segments that contain only noise, speech recognition is not performed and as a result recognition accuracy improves since the recognizer does not attempt to provide output words based on background noise. Identifying portions of a signal that contain speech is known as voice activity detection (VAD) and involves finding the starting point and the ending point of speech in the audio signal.

The discussion above is merely provided for general background information and is not intended to be used as an aid in determining the scope of the claimed subject matter.

SUMMARY

Possible segmentations for an audio signal are scored based on distortions for feature vectors of the audio signal and the total number of segments in the segmentation. The scores are used to select a segmentation and the selected segmentation is used to identify a starting point and an ending point for a speech signal in the audio signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
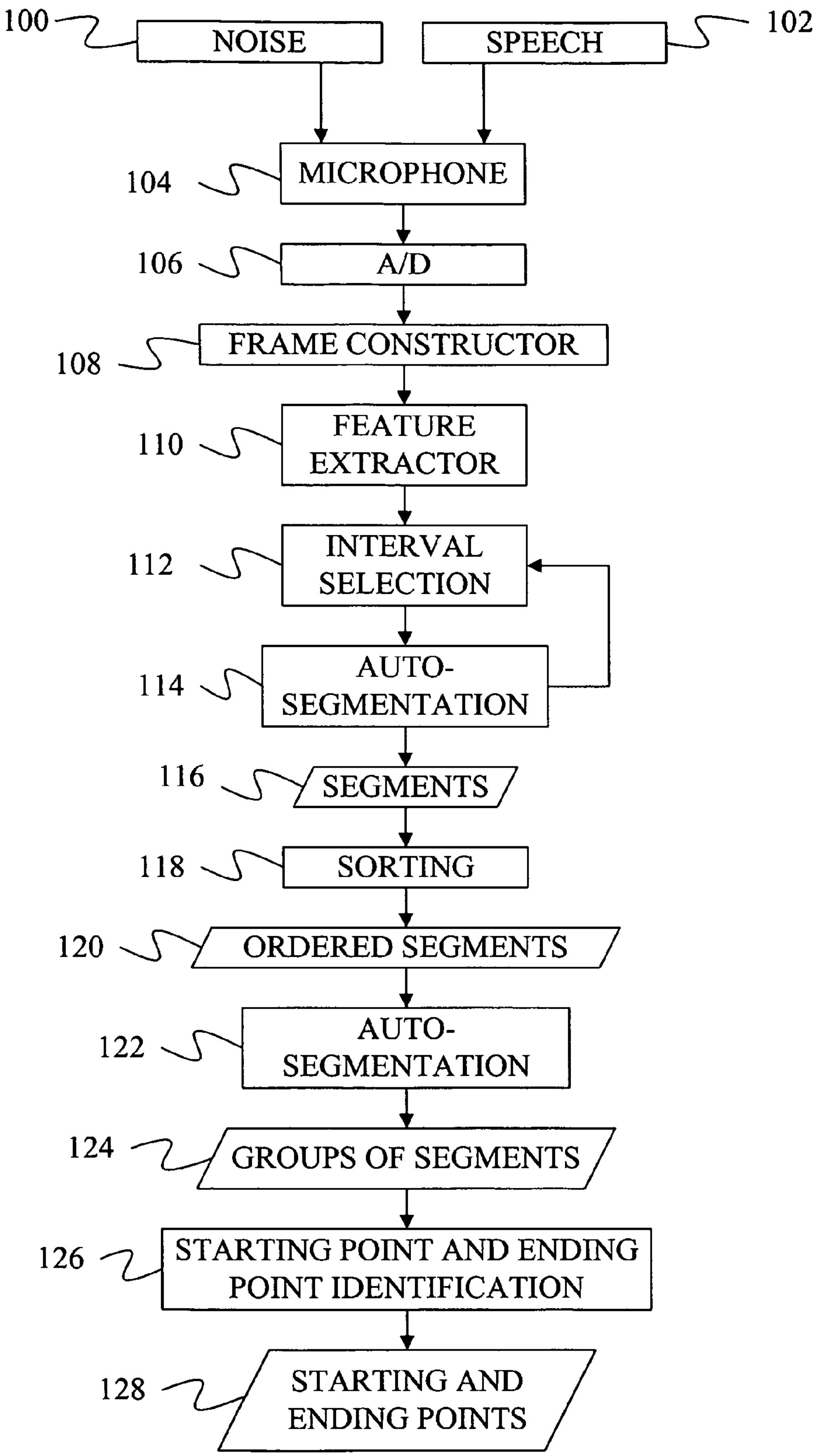
FIG. 1 is a block diagram of elements used in finding speech endpoints under one embodiment.

Embodiments described in this application provide techniques for identifying starting points and ending points of speech in an audio signal. As shown in FIG. 1, noise 100 and speech 102 are detected by a microphone 104. Microphone 104 converts the audio signals of noise 100 and speech 102 into an electrical analog signal. The electrical analog signal is converted to a series of digital values by an analog-to-digital (A/D) converter 106. In one embodiment, A/D converter 106 samples the analog signal at 16 kilohertz with 16 bits per sample, thereby creating 32 kilobytes of data per second. The digital data provided by A/D converter 106 is input to a frame constructor 108, which groups the digital samples into frames with a new frame every 10 milliseconds that includes 25 milliseconds worth of data.

A feature extractor 110 uses the frames of data to construct a series of feature vectors, one for each frame. Examples of features that can be extracted include variance normalized time domain log energy, Mel-frequency Cepstral Coefficients (MFCC), log scale filter bank energies (FBanks), local Root Mean Squared measurement (RMS), cross correlation corresponding to pitch (CCP) and combinations of those features.

The feature vectors identified by feature extractor 110 are provided to an interval selection unit 112. Interval selection unit 112 selects the set of feature vectors for a contiguous group of frames. Under one embodiment, each interval contains frames that span 0.5 seconds in the input audio signal.

The features for the frames of each interval are provided to an auto segmentation unit 114. The auto segmentation unit identifies a best segmentation for the frames based on a homogeneity criterion penalized by a segmentation complexity. For a given time interval I, which contains N frames, and a segmentation containing K segments, where $1 \leqq K \leqq N$, a segmentation S(I,K) is defined as a set of K segments where the segments contain sets of frames defined by consecutive indices such that the segments do not overlap, there is no spaces between segments, and the segments taken together cover the entire interval.

The homogeneity criterion and the segmentation complexity penalty together form a segmentation score function F[S(I,K)] defined as:

$$F[S(I,K)]=H[S(I,K)]+P[S(I,K)] \qquad \text{EQ. 1}$$

where S(I,K) is the segmentation for time interval I having K segments, H[S(I,K)] is the homogeneity criterion, and P[S(I,K)] is the penalty, which under one embodiment are defined as:

$$H[S(I,K)] = \sum_{k=1}^{K} D_k \qquad \text{EQ. 2}$$

$$P[S(I,K)] = \lambda_p K * d\log(N) \qquad \text{EQ. 3}$$

where K is the number of segments, d is the number of dimensions in each feature vector, N is the number of frames in the interval, $\lambda_p$ is a penalty weight, K*d represents the number of parameters in segmentation S(I,K) and $D_k=D(n_{k-1}+1,n_k)$, which is a distortion for the feature vectors between the first and last frame of segment k. In one embodiment, the within-segment distortion is defined as:

$$D(n_1, n_2) = \sum_{n=n_1}^{n_2} \left[\vec{x}_n - \vec{C}(n_1, n_2)\right]^T \left[\vec{x}_n - \vec{C}(n_1, n_2)\right] \qquad \text{EQ. 4}$$

$$\vec{C}(n_1, n_2) = \frac{1}{n_2 - n_1 + 1} \sum_{n=n_1}^{n_2} \vec{x}_n \qquad \text{EQ. 5}$$

where $n_1$ is an index for the first frame of the segment, $n_2$ is an index for the last frame of the segment, $\vec{x}_1$ is a feature vector for the nth frame, superscript T represents the transpose and $\vec{C}(n_1,n_2)$ represents a centroid for the segment. Although the distortion of EQs. 4 and 5 is discussed herein, those skilled in the art will recognize that other distortion measures or likelihood measures may be used.

An optimal segmentation S*(I) is obtained by minimizing F[S(I,K)] over all segment numbers and segment boundaries.

Since the segmentation complexity is independent of the positions of the segment boundaries when the number of segments is fixed, minimizing F[S(I,K)] can be separated into two successive procedures, first minimizing H[S(I,K)] for each number of segments K and then finding the minimum value of F[S(I,K)] over all K.

Under one embodiment, the minimum of H[S(I,K)] is found using a dynamic programming procedure that has multiple levels and identifies a new segment with each level. Thus, given K segments, there would be a total of L=K levels in the dynamic programming search. To improve the efficiency of the dynamic programming search, under one embodiment the number of frames in each segment is limited to a range $[n_a,n_b]$. The lower bound, $n_a$, is the shortest duration that a phone can occupy, and the upper bound, $n_b$, is used to save computing resources. Under one embodiment, the lower bound is set to 3 frames and the upper bound is set to 25 frames. Using this range of lengths for each segment, two boundary functions can define the range of ending frame indices for a given level l as $B_a(l)=n_a l$ and $B_b(l)=n_b l$.

Figure 2:
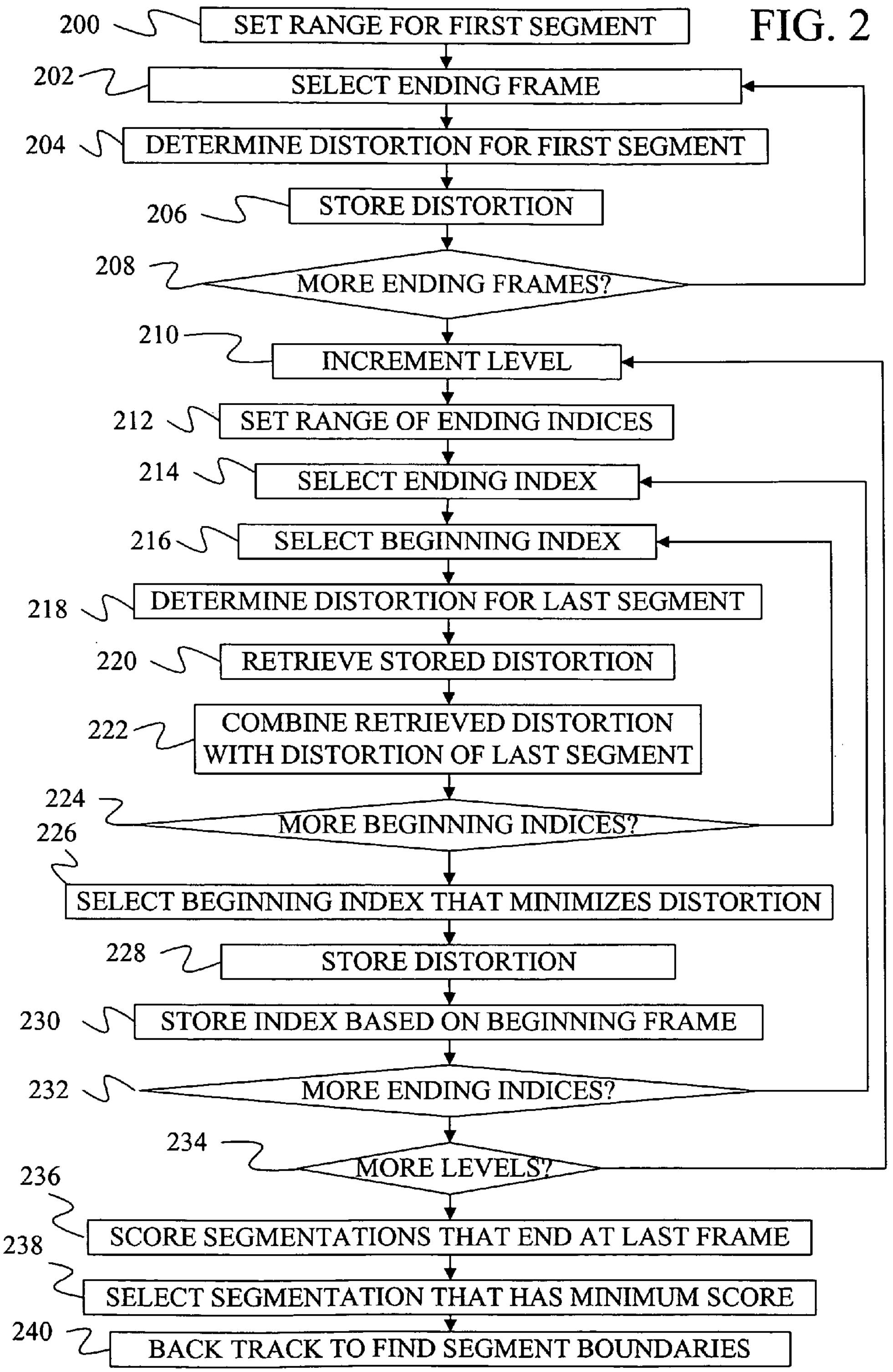
FIG. 2 is a flow diagram of auto segmentation under one embodiment.

FIG. 2 provides a flow diagram of an auto-segmentation method under one embodiment of the present invention.

In step 200, the range of ending frame indices, n, for the first segment is set using the two boundary functions. As such, the range of indices is from $n_a$ to $n_b$. At step 202, one of the indices, n, for the ending frame is selected and at step 204 a distortion value D(1,n) is determined using EQS. 4 and 5 above and the feature vectors associated with the frames from frame 1 to frame n. At step 206, each distortion value is stored as H*(n,l) where n is the index for the last frame in the segmentation and l is set equal to one and represents the number of segments in the segmentation. Thus, the distortion values are indexed by the ending frame associated with the value and the number of segments in the segmentation.

At step 208, the method determines if there are more possible ending frames for the first segment. If there are more ending frames, the process returns to step 202 to select the next ending frame.

When there are no more ending frames to process for the first segment, the method continues at step 210 where the level is incremented. At step 212, the range of ending indices n, is set for the segment associated with the new level. The lower boundary for the ending index is set equal to the boundary function $B_a(l)=n_a l$ and the upper boundary for the ending index is set equal to the minimum of: the total number of frames in the interval, N, and the boundary function $B_b(l)=n_b l$, where l is the current level.

At step 214, an ending index, n, is selected for the new level of segmentation. At step 216, a search is started to find the beginning frame for a segment that ends at ending index n. This search involves finding the beginning frame that results in a minimum distortion across the entire segmentation. In terms of an equation, this search involves:

$$H^*(n, l) = \min_j\{H^*(j, l-1) + D(j+1, n)\} \qquad \text{EQ. 6}$$

where j+1 is the index of the beginning frame of the last segment and j is limited to:

$$\max(n_a \times (l-1), n-n_b) \leqq j \leqq n-n_a \qquad \text{EQ. 7}$$

In step 216, a possible beginning frame consistent with the range described by EQ. 7 is selected. At step 218, the distortion D(j+1,n) is determined for the last segment using the selected beginning frame and equations 4 and 5 above. At step 220, j, which is one less than the beginning frame of the last segment, and the previous level, l−1, are used as indices to retrieve a stored distortion H*(j,l−1) for the previous level, l−1. The retrieved distortion value is added to the distortion computed for the last segment at step 222 to produce a distortion that is associated with the beginning frame of the last segment.

At step 224, the method determines if there are additional possible beginning frames for the last segment that have not been processed. If there are additional beginning frames, the next beginning frame is selected by returning to step 216 and steps 216, 218, 220, 222 and 224 are repeated for the new beginning frame. When all of the beginning frames have been processed at step 224, the beginning frame that provides the minimum distortion is selected at step 226. This distortion, H*(n,l), is stored at step 228 such that it can be indexed by the level or number of segments l and the index of the last frame, n.

At step 230, the index j in EQ. 6 that result in the minimum for H*(n,l) is stored as p(n,l) such that index j is indexed by the level or number of segments l and the ending frame n.

At step 232, the process determines if there are more ending frames for the current level of dynamic processing. If there are more frames, the process returns to step 214 where n is incremented by one to select a new ending index. Steps 216 through 232 are then performed for the new ending index.

When there are no more ending frames to process, the method determines if there are more levels in the dynamic processing at step 234. Under one embodiment, the total number of levels is set equal to the largest integer that is not greater than the total number of frames in the interval, N, divided by $n_a$. If there are more levels at step 234, the level is incremented at step 210 and steps 212 through 234 are repeated for the new level.

When there are no more levels, the process continues at step 236 where all segmentations that end at the last frame N and result in a minimum distortion for a level are scored using the segmentation score of equation 1 above. At step 238, the segmentation that provides the best segmentation score is selected. Thus, the selection involves selecting the segmentation, S*(N,l*), associated with:

$$l^* = \operatorname*{argmin}_l[H^*(N, l) + \lambda_p l d \log(N)] \qquad \text{EQ. 8}$$

Once the optimal segmentation has been selected, the process backtracks through the segmentation at step 240 to find segment boundaries using the stored values p(n,l). For example, p(N,l*) contains the value, j, of the ending index for the segment proceeding the last segment in the optimal segmentation. This ending index is then used to find p(j,l*−1), which provides the ending index for the next preceding segment. Using this backtracking technique, the starting and ending index of each segment in the optimal segmentation can be retrieved.

Returning to FIG. 1, after auto-segmentation unit 114 has identified an optimal segmentation consisting of segments 116 for the selected interval, interval selection unit 112 selects the next interval in the audio signal. When auto-segmentation unit 114 has identified an optimal segmentation for each interval, segments 116 contain segments for the entire audio signal. Segments 116 are then provided to a sorting unit 118, which sorts the segments to form ordered segments 120.

Figure 3:
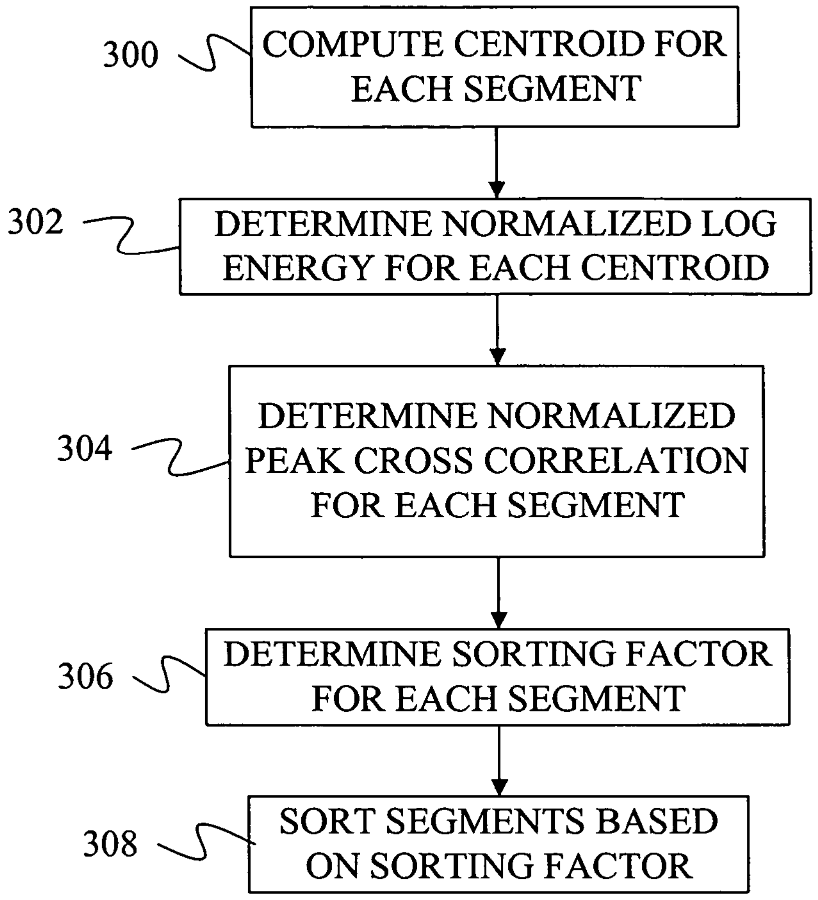
FIG. 3 is a flow diagram for sorting segments under one embodiment.

FIG. 3 provides a flow diagram of a method for sorting the segments. In step 300 of FIG. 3, a centroid is determined for each segment. Under one embodiment, the centroid is computed using EQ. 5 above. At step 302, the normalized log energy for each centroid is determined. Under one embodiment, the normalized log energy is the segment mean of the normalized log energy extracted at step 110. At step 304, a normalized peak cross correlation value is determined for each segment. This cross correlation value is the segment mean of the peak cross-correlation value determined in step 110.

In general, segments that contain noisy speech will have a higher log energy and a higher peak cross correlation value than segments that contain only noise. Using the normalized log energy and the normalized peak cross correlation value, a sorting factor is determined for each segment at step 306 as:

$$Q_k = E_k + P_k \quad \text{EQ. 9}$$

Where $Q_k$ is the sorting factor for segment k, $E_k$ is the normalized time-domain log energy, and $P_k$ is the normalized peak cross correlation corresponding to pitch value.

At step 308, the segments are sorted based on their sorting factor from lowest sorting factor to greatest sorting factor. This creates an ordered list of centroids with each centroid associated with one of the segments.

Although normalized log energy and peak cross correlation corresponding to pitch are used to form the sorting factor in the example above, in other embodiments, other features may be used in place of these features or in addition to these features.

Returning to FIG. 1, at step 122, the ordered list of centroids is provided to an auto-segmentation unit 122, which segments the ordered centroids into two groups, with one group representing noisy speech and the other group representing noise. Under one embodiment, this segmentation is performed by identifying the centroid j that marks the boundary between noisy speech and noise using:

$$j^* = \underset{j}{\operatorname{argmin}}(D(1, j) + D(j+1, l^*)) \quad \text{EQ. 10}$$

Where D is computed using EQS. 4 and 5 above but replacing the vector $\vec{x}_n$ with the centroid for the segment and replacing $n_1$, $n_2$ with the indices of the centroids in the ordered list of centroids. The segments associated with the centroids up to index j are then denoted as noise and the segments associated with centroids from index j+1 to l* are designated as noisy speech.

The grouped segments 124 produced by auto-segmentation unit 122 are provided to a starting point and ending point identification unit 126 of FIG. 1. Identification unit 126 selects the segments in the noisy speech group and identifies the segment in the selected group that occurs first in the audio signal and the segment that occurs last in the audio signal. The first frame of the first segment is then marked as the starting point of noisy speech and the last frame of the last segment is marked as the end point for noisy speech. This produces starting and ending points 128.

After the starting point and end point have been detected, noise signals before the starting point and after end point will not be decoded by the speech recognizer. In further embodiments, frames that contain only noise, including frames between the starting point and endpoint, are used by noise reduction schemes such as Winner filtering.

Figure 4:
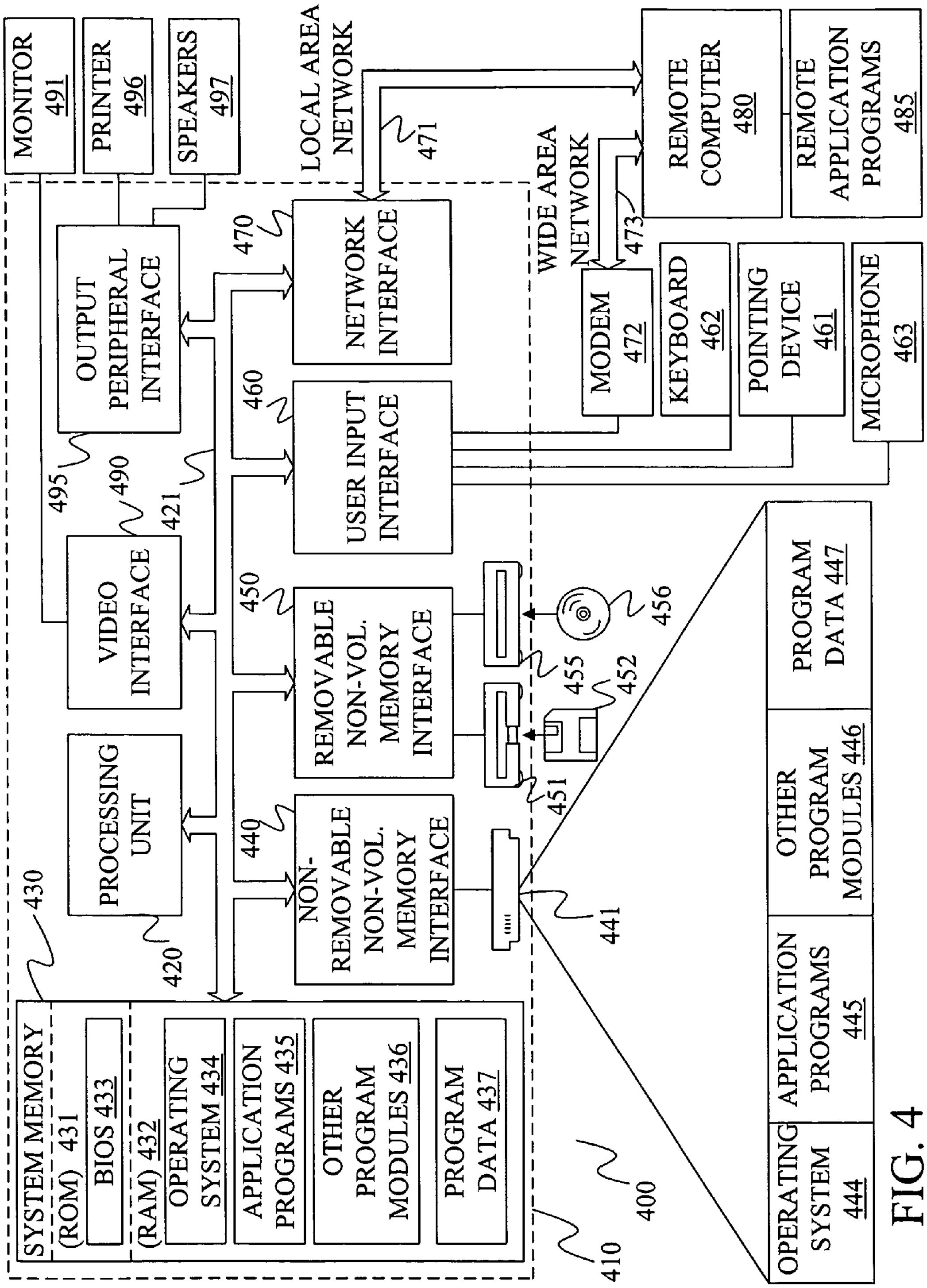
FIG. 4 is a block diagram of one computing environment in which some embodiments may be practiced.

FIG. 4 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

scoring possible segmentations of an audio signal, each score based on distortions for feature vectors of the audio signal and the total number of segments in the segmentation;

using the scores to select a segmentation; and a processor using the selected segmentation to identify a starting point and an ending point for a speech signal in the audio signal, wherein using the selected segmentation to identify a starting point and an ending point for a speech signal in the audio signal comprises:

determining a sorting factor for each segment in the selected segmentation;

sorting the segments based on the sorting factor;

segmenting the sorted segments to produce two groups of segments, with one group being associated with noisy speech; and identifying the starting point and the ending point for the speech signal in the group of segments associated with noisy speech.

2. The method of claim 1 wherein scoring possible segmentations comprises:

selecting an ending frame for a segmentation having one segment;

determining a distortion for the one segment; and storing the distortion using the ending frame and a designation indicating the number of segments in the segmentation to index the stored distortion.

3. The method of claim 2 wherein scoring possible segmentations further comprises:

selecting an ending frame for a segmentation having two segments; and identifying a beginning frame for a last segment in the segmentation by determining which beginning frame provides a best distortion.

4. The method of claim 3 wherein determining which beginning frame provides a best distortion comprises:

for each of a set of possible beginning frames:

selecting a beginning frame for the last segment;

determining a distortion for the last segment in the segmentation;

retrieving a stored distortion associated with a one segment segmentation;

combining the retrieved distortion with the distortion for the last segment to determine a distortion for the segmentation associated with the beginning frame; and comparing the distortions associated with each beginning frame to identify the beginning frame that provides the best distortion.

5. The method of claim 4 further comprising storing an index based on the beginning frame that provides the best distortion by using the ending frame of the segmentation and the number of segments in the segmentation to index the stored index.

6. The method of claim 4 further comprising storing the best distortion by using the ending frame of the segmentation and the number of segments in the segmentation to index the stored distortion.

7. The method of claim 4 further comprising:

identifying a beginning frame for a last segment in a segmentation containing a first number of segments that ends at the last frame of the audio signal, wherein the beginning frame is identified by determining which beginning frame provides a best distortion for the segmentation;

identifying a beginning frame for a last segment in a second segmentation containing a second number of segments that ends at the last frame of the audio signal, wherein the beginning frame is identified by determining which beginning frame provides a best distortion for the second segmentation;

scoring the segmentation using the best distortion for the segmentation and the number of segments in the segmentation to form a first score;

scoring the second segmentation using the best distortion for the second segmentation and the second number of segments in the second segmentation to form a second score; and using the first score and the second score to select a segmentation.

8. The method of claim 1 wherein identifying the starting point for the speech signal comprises identifying the segment in the group associated with noisy speech that occurs first in the audio signal and identifying the first frame in that segment as the starting point for the speech signal.

9. The method of claim 1 wherein identifying the ending point for the speech signal comprises identifying the segment in the group associated with noisy speech that occurs last in the audio signal and identifying the last frame in that segment as the ending point for the speech signal.

10. The method of claim 1 wherein the sorting factor comprises a normalized log energy and peak cross correlation for the segment.

11. A computer storage medium having computer-executable instructions for performing steps comprising:

segmenting frames of an audio signal into segments, wherein segmenting frames of the audio signal comprises evaluating only the possible segmentations in which segments end at particular ranges of frame indices;

sorting the segments based on a sorting factor to form ordered segments;

segmenting the ordered segments into at least two groups;

selecting one of the groups;

identifying a segment in the selected group as containing a starting point for speech in the audio signal; and identifying a second segment in the selected group as containing an ending point for speech in the audio signal.

12. The computer storage medium of claim 11 wherein segmenting frames of an audio signal comprises:

identifying a beginning frame for a last segment in a segmentation containing a first number of segments that ends at the last frame of the audio signal, wherein the beginning frame is identified by determining which beginning frame provides a best distortion for the segmentation;

identifying a beginning frame for a last segment in a second segmentation containing a second number of segments that ends at the last frame of the audio signal, wherein the beginning frame is identified by determining which beginning frame provides a best distortion for the second segmentation;

scoring the segmentation and the second segmentation to form a first score and a second score; and using the first score and the second score to select a segmentation.

13. The computer storage medium of claim 12 wherein scoring the segmentation comprises using the number of segments in the segmentation to score the segmentation.

14. The computer storage medium of claim 11 wherein segmenting the ordered segments comprises forming a centroid for each segment and segmenting the centroids into groups to produce a minimum distortion between centroids in the groups.

15. A method comprising:

a processor forming a centroid for each of a plurality of segments in an audio signal;

a processor sorting the segments based on sorting factors associated with the segments to form sorted segments wherein the sorting factor for a segment is based on the log energy and the peak cross correlation of the centroid for the segment; and a processor segmenting the sorted segments into at least two groups by computing distortions between the centroids.

16. The computer-readable medium of claim 15 further comprising forming the segments by selecting a segmentation for an audio signal based on a distortion for a segmentation and the number of segments in the segmentation.

17. The computer-readable medium of claim 15 further comprising selecting one of the groups, identifying a segment in the selected group as containing a starting point for speech in the audio signal and identifying a segment in the selected group as containing an ending point for speech in the audio signal.

* * * * *